United States Patent [19]

Stahlhuth

[11] Patent Number: 4,933,591
[45] Date of Patent: * Jun. 12, 1990

[54] DOUBLE SAGGITAL PULL STROKE AMPLIFIER

[75] Inventor: Paul H. Stahlhuth, Mission Viejo, Calif.

[73] Assignee: Ford Aerospace Corporation, Newport Beach, Calif.

[ * ] Notice: The portion of the term of this patent subsequent to Feb. 28, 2006 has been disclaimed.

[21] Appl. No.: 280,755

[22] Filed: Dec. 6, 1988

Related U.S. Application Data

[63] Continuation-in-part of Ser. No. 141,237, Jan. 6, 1988.

[51] Int. Cl.$^5$ ............................................. H01L 41/08
[52] U.S. Cl. ................................................... 310/328
[58] Field of Search ....................... 310/328, 346, 366

[56] References Cited

U.S. PATENT DOCUMENTS

| | | | |
|---|---|---|---|
| 2,386,279 | 10/1945 | Tibbetts | 171/327 |
| 2,416,887 | 3/1947 | Tibbetts | 171/327 |
| 2,810,082 | 10/1957 | Tibbetts | 310/8.2 |
| 3,558,936 | 1/1971 | Horan | 310/8.1 |
| 3,649,857 | 3/1972 | Knappe | 310/8.7 |
| 3,697,790 | 10/1972 | Flint et al. | 310/8.3 |
| 4,193,703 | 3/1980 | Sakmann | 400/124 |
| 4,318,023 | 3/1982 | O'Neill et al. | 310/328 |
| 4,389,657 | 6/1983 | McMahon | 346/140 R |
| 4,436,423 | 3/1984 | Kumar et al. | 356/350 |
| 4,450,375 | 5/1984 | Siegal | 310/331 |
| 4,514,858 | 4/1985 | Novak | 378/34 |
| 4,516,253 | 5/1985 | Novak | 378/34 |
| 4,525,852 | 6/1985 | Rosenberg | 378/34 |
| 4,533,248 | 8/1985 | Baumann | 356/350 |
| 4,540,240 | 9/1985 | Kadi | 350/255 |
| 4,547,086 | 10/1985 | Matsumoto et al. | 400/124 |
| 4,570,095 | 2/1986 | Uchikawa | 310/328 |
| 4,629,926 | 12/1986 | Siegal | 310/331 |
| 4,675,568 | 6/1987 | Uchikawa et al. | 310/328 |
| 4,703,215 | 10/1987 | Asano | 310/328 |
| 4,706,230 | 11/1987 | Inoue et al. | 367/174 |
| 4,769,569 | 9/1988 | Stahlhuth | 310/328 |
| 4,808,874 | 2/1989 | Stahlhuth | 310/328 |

FOREIGN PATENT DOCUMENTS

| | | | |
|---|---|---|---|
| 0217880 | 9/1987 | Japan | 310/328 |
| 535114 | 12/1976 | U.S.S.R. | |
| 608206 | 4/1978 | U.S.S.R. | |

OTHER PUBLICATIONS

"Piezomotors, Electromechanical Muscle"—C. G. O'Neill, D. S. Randall and P. C. Smiley, SAE #800502, 1980.

Primary Examiner—Mark O. Budd
Attorney, Agent, or Firm—Paul K. Godwin, Jr.; Clifford L. Sadler

[57] ABSTRACT

A piezoelectric motor actuated amplifier mechanism that utilizes a pair of saggital linkages having one relatively fixed saggital midpoint and joined at their end points to obtain a doubled amplification factor pull stroke output from one relatively movable saggital midpoint. Thermal compensators are employed between the piezoelectric actuator and the saggital linkages to stabilize the amplifier throughout a wide range of temperatures.

9 Claims, 1 Drawing Sheet

DOUBLE SAGGITAL PULL STROKE AMPLIFIER

RELATED APPLICATIONS

This is a continuation-in-part of U.S. Ser. No. 141,237, filed Jan. 6, 1988 entitled Double Saggital Stroke Amplifier; and is related to U.S. Ser. No. 144,910, filed Jan. 19, 1988 entitled Piezoelectric Stack Motor Stroke Amplifier, now U.S. Pat. No. 4,769,569.

BACKGROUND OF THE INVENTION

1. Field of the Invention

This invention relates to the field of mechanical amplifier mechanisms and more specifically to the area of stroke amplifiers which use saggital linkages.

2. Description of the Prior Art

Several piezoelectric or electroexpansive actuators have been described in the prior art which are connected with levers and saggital linkages to produce motion amplification. In those cases, a high force, short stroke expansion or contraction of a piezoelectric actuator is amplified as a lower force, longer stroke movement.

In U.S. Pat. No. 4,318,023 (incorporated herein by reference), a saggitally amplified mechanism is described in which a lever arm is pivotally connected to a fixed base support and is driven for movement by an electroexpansive actuator. The end of the lever arm, opposite the pivot end, is connected to one end of a saggital tension member. The opposite end of the saggital tension member is connected to the fixed base support. Upon actuation of the electroexpansive actuator, the lever arm is pivoted to increase the tension on the saggital member and cause the midpoint of the saggital member to be moved in a direction perpendicular to the longitudinal axis defined between the end points of the saggital tension member. Such saggital amplification devices are preferred due to the inherent high rigidity, low play and lower overall mass of components that are necessary to provide amplified movement at an appropriate force for such applications as valves for liquid or air flow control or pin actuators for printer heads.

The 1980 SAE paper No. 800502 entitled "Piezomotors - Electromechanical Muscle" by O'Neill et al (incorporated herein by reference) describes in some detail the properties and construction of piezoelectric actuators that can either be shortened or lengthened when subjected to an electric field and employed in amplification devices.

SUMMARY OF THE INVENTION

The present invention is intended to provide an electromechanical amplifier that proportionally doubles the pull stroke movement available in conventional saggital mechanisms, without the use of levers. The present invention achieves the desired result through the use of a double saggital linkage mechanism that is fixed at one saggital midpoint. The mechanism utilizes an electroexpansive actuator that is longitudinally connected between and moves with the joined end points of the two saggital linkages. The midpoints of the two linkages are bowed outward with respect to the separation at their end points so that the elongation of the actuator will cause those midpoints to be drawn toward each other. The midpoint of the second saggital linkage is utilized to provide the mechanically amplified pull stroke output movement of the linkage to a usable device, such as an illustrated valve.

A unitary structure is described having two pairs of rigid links between eight reduced thickness flexures to define a pair of saggital linkages. The use of flexures as pivot points for the links allows for restoration energy storage when the structure is deformed by energization of the electroexpansive actuator. Furthermore, friction losses are eliminated and actuation output stroke losses are minimized, when compared to prior art mechanisms which use abutting elements such as levers supported by axles, pins or knife edges with their inherent play or elastic deformation properties.

Thermal compensators are also described as being employed between the end points of the electroexpansive actuator element and the end points of the saggital frame, to provide a thermally stable mechanical amplifier.

It is therefore an object of the present invention to provide a double saggital amplifier mechanism which is capable of at least a 10 to 20 fold increase in electroexpansive output pull stroke.

It is also an object of the present invention to provide a mechanism which effectively doubles the output available (amplification ratio), as compared to a conventional saggital amplifier, by employing a pair of saggital linkages joined at their respective end points and referenced with respect to a relatively fixed midpoint.

It is another object of the present invention to provide a double saggital stroke amplifier which utilizes a unitary structure to define both saggital linkages in a bowed configuration.

It is a further object of the present invention to provide a thermally stable electromechanical stroke amplifier by including appropriately selected thermal compensating elements between the electroexpansive actuator and the double saggital linkages.

DETAILED DESCRIPTION OF A PREFERRED EMBODIMENT

Figure 1:
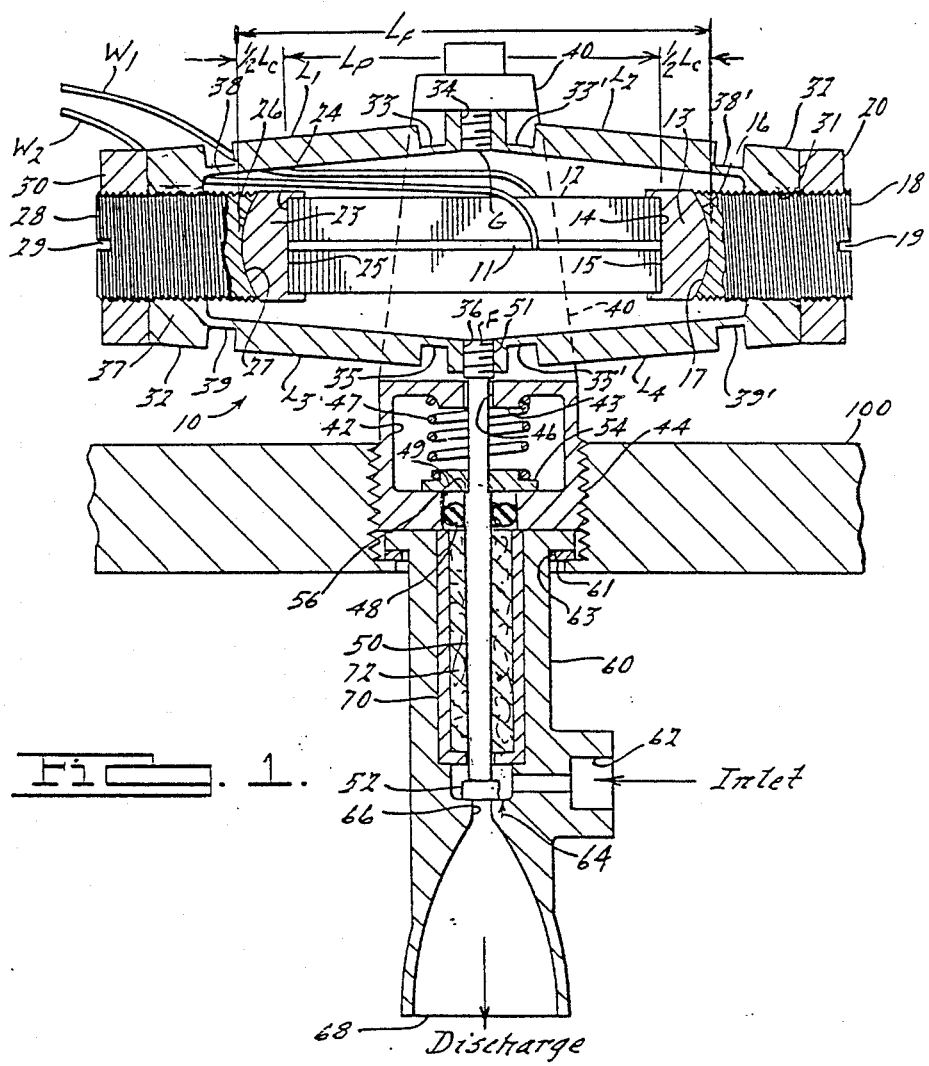
FIG. 1 is an elevational cross-section of the preferred embodiment of the present invention.

The double saggital stroke amplifier of the present invention is designated as 10 in FIG. 1. It is shown connected to a relatively rigid reference support frame 40 so as to provide a pulling force to a longitudinally movable valve stem 50. The installation of the double saggital stroke amplifier 10 to pull a valve stem 50 is exemplary of the many uses found for mechanical stroke amplifiers. Typically, it is important that the actuation provided by the mechanical amplifier be instantaneously responsive, precise, and temperature insensitive. In the displayed embodiment, a hot gas valve, such as that which may be employed on a steering jet for a projectile or a guided missile, is controlled.

A piezoelectric (electroexpansive) actuator 12 is made up of a plurality of bonded disks that are separated by electrically conducting films to provide the necessary electric fields that cause longitudinal expansion. A bus bar 11 is shown on the front side of the actuator 12 to provide an electrical interconnection between every other interstitial conducting film. Similarly, a bus bar (not shown) is on the opposite side of the actuator 12 and provides a similar interconnection between the other interstitial conducting films. Electrical wires $W_1$ and $W_2$, from an energizing electrical source (not shown) are shown as connected to the respective bus bars. In operation, a voltage of a predetermined value is applied to wires $W_1$ and $W_2$ and the length of the electroexpansive actuator 12 will increase by a predetermined amount.

Ends 14 and 24 of the actuator 12 are respectively inserted into retaining cups 15 and 25 of thermal compensator elements 13 and 23. Outer spherical surfaces 16 and 26 of the thermal compensators 13 and 23 maintain alignment of the actuator assembly within concave spherical surfaces 17 and 27 of compression screws 18 and 28.

A unitary structure 32 defines two saggital linkages which are commonly actuated to provide an amplified pulling stroke movement at the relatively floating connector 36 in response to a high force, low distance output of the actuator 12. The unitary structure 32 in this embodiment has been formed of 17-4 precipitation hardened stainless steel (Other light weight materials such as beryllium or titanium may also be selected for the frame material as long as they have a high yield strength, a high Young's modulus of elasticity and good fatigue strength properties appropriate for the task.). The unitary structure 32 defines a first saggital linkage with relatively rigid links $L_1$ and $L_2$, of equal length between flexures 33 and 38 (for $L_1$) and 33' and 38' (for $L_2$). The midpoint of the first saggital linkage is labeled as "G" (fixed point in FIG. 2) and is fixedly attached to the relatively rigid reference support frame 40 by a threaded connector 34.

The unitary structure 32 also forms a second saggital linkage with relatively rigid links $L_3$ and $L_4$, of equal length between flexures 35 and 39 (for $L_3$) and 35' and 39' (for $L_4$). The midpoint of the second saggital linkage labeled as "F" (movable point in FIG. 2) is attached to the movable valve stem 50 via a threaded connector 36 to provide an amplified pulling stroke output. A pair of bridges 31 and 37 are an integral part of the unitary structure 32 and respectively provide rigid connections between the end points defined at the flexures 38' and 38 of the first saggital linkage to the end points defined at the flexures 39 and 39' of the second saggital linkage. The bridges 31 and 37 contain threaded apertures coaxial with the electroexpansive actuator 12 to retain the respective compression screws 18 and 28 that are adjustable to provide preload between the unitary structure 32 and the actuator 12. Internally threaded jam nuts 20 and 30 lock the respective compression screws 18 and 28 to their preload settings. The compression screws 18 and 28 are set to both preload the structure and to retain the actuator 12 so that it will be free to move with the end points of the saggital linkages joined by the bridges 31 and 37.

In the embodiment shown in FIG. 1, the reference support frame 40 is shown connected to a housing 100 via threads 44 formed at a portion remote from the saggital linkage. The support frame 40 is mated, coaxially, with a valve housing 60 and the movable valve stem 50 that extends through positions of both the frame 40 and the valve housing 60. The valve housing 60 is shown abutting the lower portion of the support frame 40 and contains an upper flange 63 that abuts a sealing member 61.

Valve stem 50 contains an upper threaded end 51 that interconnects with threaded connector 36 at the midpoint of the second saggital linkage. The valve stem 50 extends from the threaded end 51 through an aperture 46 in the frame 40. An internal cavity 42 contains a spring 47 that is under compression between a spring seat 43 and a washer 54 abutting a shoulder 56 formed on the valve stem 50. The lower end of the valve stem 50 contains a poppet 52 which, due to the biasing by the spring 47 against the washer 54 and the shoulder 56 and the gas pressure forces acting on poppet 52 closes the passage between inlet 62 and outlet 66. In order to prevent circulation of hot pressurized gases present at the inlet 62, the valve housing 60 contains an internal baffle 70 which is filled with an insulating material 72 that allows the valve stem 50 to be translated longitudinally while at the same time minimizing heat transfer from the hot gases to the actuator mechanism. An O-ring seal 48 is provided above the insulating material 72 to prevent leakage of the gases.

It can be seen from the mechanism described in FIG. 1 that by energizing the electroexpansive actuator 12 to produce an elongation of that element the corresponding displacement of the end points of the double saggital linkage will correspondingly occur. Due to the fact that the two saggital linkages are bowed outwards with respect to each other, the expansion of the actuator 12 causes the midpoints to be drawn closer together. Such movement produces a result that the valve stem 50 will be drawn upwards against the resistance provided by the spring 47, the O-ring seal 48 and gas pressure forces on poppet 52, to open the valve seat 64 and allow the passage of pressurized gas to be discharged through nozzle 68. A more detailed description of the mechanics and advantages to the double saggital linkage is provided below with reference to FIG. 2.

Figure 2:
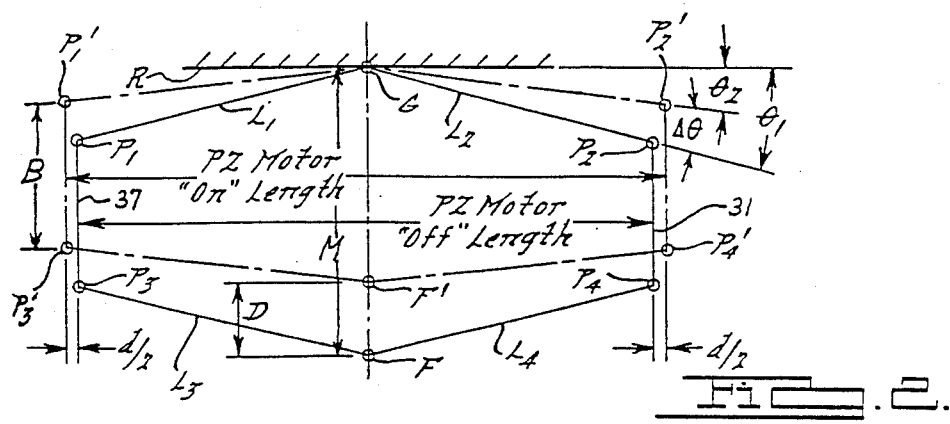
FIG. 2 is a schematic diagram illustrating the linkage movement of the present invention.

FIG. 2 is a schematic diagram that shows the geometrical relationship of the movable elements in the double saggital stroke amplifier 10 shown in FIG. 1. A fixed reference plane R extends through midpoint G (corresponding to the location of the flexures 33 and 33') of a first saggital linkage that includes links $L_1$ and $L_2$, and the end points $P_1$ and $P_2$ (corresponding to the location of respective flexures 38 and 38'). The links $L_1$ and $L_2$ are shown in a preloaded but unactuated position (the piezoelectric actuator motor 12 deenergized) at an angle $\theta_1$ with respect to the reference plane R. End points $P_3$ and $P_4$ of the second saggital linkage are rigidly joined (by bridge elements 31 and 37) and separated by a distance "B" so that the second saggital linkage will be translated as a whole with the end points $P_1$ and $P_2$ of the first saggital linkage. The midpoint F (corresponding to the location of the flexures 35 and 35') of the second saggital linkage between links $L_3$ and $L_4$ is forced to move with that second linkage. The midpoint F is separated from the midpoint G by a distance M, which is greater than the distance B; and the two linkages are bowed with maximum separation at their midpoints.

Upon energization of the electroexpansive actuator 12, the length of that piezoelectric motor changes by a distance "d"; and since the actuator 12 is suspended between the end points of each saggital linkage and referenced at the fixed midpoint G, it causes the four end points to move an equal amount d/2 outwardly from their normal deenergized positions. The links $L_1$ and $L_2$ are nonexpansive and pivotable with respect to fixed midpoint G. Therefore, the end points $P_1$ and $P_2$ are translated to positions $P'_1$ and $P'_2$ as shown in FIG. 2. The angle the linkages $L_1$ and $L_2$ form with the reference plane R is decreased by $\Delta\theta$ to $\theta_2$. The relocation of end points $P_1$ and $P_2$ to $P'_1$ and $P'_2$, causes end points $P_3$ and $P_4$ to be relocated to points $P'_3$ and $P'_4$ respectively. The outward movement of the end points $P_3$ and $P_4$ of the second saggital linkage, forces links $L_3$ and $L_4$ to be pivoted at point F to a shallower angle as the midpoint F is moved a total distance "D" to a point designated as F'. Accordingly, the amplification ratio of the double saggital linkage is expressed as D/d where D equals the amplified output stroke between F and $F_1$ and d equals the total actuator input stroke. The amplification ratio for this double saggital configuration may be selected by the user, depending upon the selection of the sum of the angles $\theta_1 + \theta_2$. Experience by the inventor has taught that the flexing angle $\Delta\theta$, where $\Delta\theta = \theta_1 - \theta_2$, is preferably selected as a low value in order to minimize bending stress in the flexures.

The common link length "L", the initial angle $\theta_1$ of the links from the established reference plane R and the final angle $\theta_2$ of the links are all factors which are determinative of the actual value of the amplification ratio D/d. The following relationships apply.

Output Stroke:
$$D = 2L(\sin\theta_1 - \sin\theta_2)$$

Input Stroke:
$$d = 2L(\cos\theta_2 - \cos\theta_1)$$

Amplification ratio:
$$D/d = \frac{\sin\theta_1 - \sin\theta_2}{\cos\theta_2 - \cos\theta_1} = \frac{1}{\tan\left(\frac{\theta_1 + \theta_2}{2}\right)}$$

The required length L of each of the links:
$$L = \frac{0.5D}{(\sin\theta_1 - \sin\theta_2)}$$

The thermal compensation considerations for the present invention are discussed with reference to FIG. 1. Such considerations are necessary, due to the fact that the material used to form the unitary structure frame 32 has a higher coefficient of thermal expansion ($\alpha_F = 6.00 \times 10^{-6}$ in/in °F.) than does the piezoelectric actuator 12 ($\alpha_P = 2.22 \times 10^{-6}$ in/in °F.). Without thermal compensators 13 and 23, the use of the device would be limited to a constant predetermined temperature environment. In this case aluminum was selected to form the thermal compensators 13 and 23 since aluminum has a higher coefficient of thermal expansion ($\alpha_C = 13.10 \times 10^{-6}$ in/in °F.) than both the piezoelectric actuator 12 and the frame 32. The total length "$L_C$" of the two thermal compensators 13 and 23 was calculated as:

$$L_C = \frac{\alpha_F L_F - \alpha_P L_P}{\alpha_C}$$

where $L_F$ is the length of the frame 32; and $L_P$ is the length of the piezoelectric actuator 12.

This temperature compensation insures that the valve stem 50 will not be displaced independently of intended actuation, due to thermal expansion effects and that the amplification ratio will remain constant over the total range of operating environmental temperatures.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A double saggital stroke amplifier, comprising:
    an electroexpansive actuator energizable with a predetermined value of voltage to responsively expand in length by a predetermined amount;
    a relatively rigid reference support frame;
    means providing a first saggital linkage having first and second ends connected to respective ends of said electroexpansive actuator, and the midpoint of said first linkage being connected to said support frame;
    means providing a second saggital linkage having first and second ends connected to respective ends of said electroexpansive actuator, and the midpoint of said second linkage being free to move in response to said electroexpansive actuator and with respect to the fixed midpoint of said first linkage;
    wherein said midpoints of said first and second linkages are separated from each other by a distance greater than the distance between connected endpoints.

2. An amplifier as in claim 1, wherein said means providing said first and second saggital linkages is a unitary structure comprising four relatively rigid links having predetermined and equal lengths; a flexure area defined at the end of each link; and bridge means for interconnecting the ends of the electroexpansive actuator and the ends of the first and second saggital linkages at the corresponding flexure areas.

3. An amplifier as in claim 2, wherein said bridge means further includes a threaded aperture extending coaxial with said electroexpansive actuator and an adjustable means is provided to be inserted into said aperture that is adjustable along said axis of said electroexpansive actuator to tighten the connection between said actuator and the first and second linkages.

4. An amplifier as in claim 3, wherein the midpoint of said first saggital linkage is located between a first pair of flexure areas and is formed as part of said unitary structure for permanent connection to said support frame.

5. An amplifier as in claim 4, wherein said the midpoint of said second saggital linkage is located between a second pair of flexure areas and is formed as part of said unitary structure to define the output connection for the amplifier.

6. An amplifier as in claim 5, and further including means for providing thermal compensation located between the ends of the electroexpansive actuator having a known first coefficient of thermal expansion and the unitary structure having a known second coefficient of thermal expansion.

7. An amplifier as in claim 6, wherein said thermal compensation means is formed of a material having a known third coefficient of thermal expansion selected to maintain the midpoint of the second linkage at a fixed position independent of environmental temperature changes when the electroexpansive actuator is deenergized.

8. A double saggital stroke amplifier, comprising:
    an electroexpansive actuator energizable with a predetermined value of voltage to responsively expand in length by a predetermined amount;
    a relatively rigid reference support frame;
    means providing a first saggital linkage having first and second ends connected to respective ends of said electroexpansive actuator, and the midpoint of said first linkage being connected to said support frame;

means providing a second saggital linkage having first and second ends connected to respective ends of said electroexpansive actuator, and the midpoint of said second linkage being separated from the midpoint on said first linkage by a first predetermined distance and being free to move in response to said electroexpansive actuator and with respect to the fixed midpoint of said first linkage;

wherein said first predetermined distance is greater than the distance between the connected ends.

9. A double saggital pull stroke amplifier comprising:

a first bow-shaped saggital linkage having a defined midpoint and pivotal end points;

a second bow-shaped saggital linkage having a defined midpoint and pivotal end points;

a pair of bridge elements rigidly connecting and separating corresponding pivotal end points on said first and second linkages by a predetermined first distance;

an electroexpansive actuator connected between said bridge elements for forcing said bridge elements away from each other a prescribed distance when energized;

said midpoints of said first and second bow-shaped saggital linkages are separated by a distance greater than said first distance of end point separation;

a relatively rigid reference support frame connected to said midpoint of said first linkage;

whereby said midpoint of said second linkage provides an amplified pull stroke output with respect to said fixed midpoint when said electroexpansive drive element is energized to expand by a predetermined amount in its length dimension between said bridge elements.

* * * * *